United States Patent [19]

Ando

[11] Patent Number: 5,155,491
[45] Date of Patent: Oct. 13, 1992

[54] SATELLITE RADIO SIGNAL TRACKING METHOD FOR GPS RECEIVERS

[75] Inventor: Hitoshi Ando, Saitama, Japan

[73] Assignee: Pioneer Electronic Corporation, Tokyo, Japan

[21] Appl. No.: 554,994

[22] Filed: Jul. 20, 1990

[30] Foreign Application Priority Data

Nov. 21, 1989 [JP] Japan .................. 1-300838

[51] Int. Cl.[5] .................................................. G01S 5/04
[52] U.S. Cl. .................................. 342/357; 364/449; 364/457
[58] Field of Search ............... 342/352, 357, 457; 364/449, 450, 451, 453, 456, 459; 455/12, 13

[56] References Cited

U.S. PATENT DOCUMENTS

| | | | |
|---|---|---|---|
| 4,613,864 | 9/1986 | Hofgen | 342/357 |
| 4,672,382 | 6/1987 | Fukuhara et al. | 342/357 |
| 4,743,913 | 5/1988 | Takai | 342/457 |
| 4,754,465 | 6/1988 | Trimble | 375/1 X |
| 4,797,678 | 1/1989 | Tsuji et al. | 342/352 |
| 4,837,700 | 6/1989 | Ando et al. | 364/449 |
| 4,890,233 | 12/1989 | Ando et al. | 364/457 |
| 4,903,212 | 2/1990 | Yokouchi et al. | 364/449 |
| 4,912,645 | 3/1990 | Kakihara et al. | 364/449 |
| 4,924,402 | 5/1990 | Ando et al. | 364/449 |
| 4,928,107 | 5/1990 | Kuroda et al. | 342/357 |
| 4,949,089 | 8/1990 | Ruskowski, Jr. | 342/52 |
| 4,949,268 | 8/1990 | Nishikawa et al. | 364/449 |
| 4,983,980 | 1/1991 | Ando | 342/357 |
| 4,987,420 | 1/1991 | Ianamiya | 342/457 |
| 5,036,329 | 7/1991 | Ando | 342/357 |

Primary Examiner—John B. Sotomayor
Attorney, Agent, or Firm—Sughrue, Mion, Zinn, Macpeak & Seas

[57] ABSTRACT

The satellite signal tracking method performed during the initial phase of satellite tracking operation, wherein three or more GPS satellites in a first orbit are selected for searching in sequence through one receiving channel of a GPS receiver and performing the positioning on the earth upon receipt of navigation data from the captured GPS satellite, whereby, if a first GPS satellite is failed to be caught within a specified period of time, a second GPS satellite among the selected GPS satellites in the same orbit, which is at the furthermost point from the first GPS satellite, is picked out for searching and, further, if any of the selected GPS satellites in the same orbit is failed to be caught, three or more GPS satellites in another orbit are selected for reiterating the same operation as for the first orbit, and these changes of mode provides a quick restart of the position reckoning even when the GPS receiver has lost all the navigation data in a backup memory required therefor and an expeditious operation in catching satellite signals for initializing the GPS receiver.

6 Claims, 2 Drawing Sheets

SATELLITE RADIO SIGNAL TRACKING METHOD FOR GPS RECEIVERS

BACKGROUND OF THE INVENTION

The present invention relates to a method of tracking satellite radio signals for Global Positioning System (GPS) receivers.

PRIOR ART

Positioning systems currently in service utilizing artificial satellites include a so-called Global Positioning System (GPS). This positioning system, as the name implies, will cover the entire surface of the globe by a total of 24 geodetic satellites when all of them are operational on six orbits, about 20,200 km above the Earth, which will accommodate four geodetic satellites each. Each geodetic satellite transmits a GPS signal containing navigation data for reckoning to the Earth using a spread-spectrum system. The reckoning is carried out on the ground, on the sea as well as in the air by receiving GPS signals from a plurality of geodetic satellites, for example, by receiving GPS signals from three geodetic satellites for two-dimensional positioning and from four of them for three-dimensional positioning. In this way, based on the navigation data contained in the GPS signal from each geodetic satellite, position information on the receiving point such as a latitude, longitude and altitude thereof can be reckoned in realtime.

This GPS system was originally developed for U.S. military use, however a part of the GPS signal (C/A code) has been made available for civil applications. Therefore, it is possible to build navigation systems for automobiles, ships and aircraft by using the GPS signal.

In the above GPS system, however, when the GPS signals from the GPS satellites are to be received by a GPS receiver, there needs to be such data as an approximate position of the receiving point, a clock not so deviated from the GPS clock, and almanac information usable for estimating positions of the GPS satellites. Without these information, it is not possible to tell which satellites are acceptable for tracking from the current receiving point. If such information is not available, the GPS receiver cannot determine which satellites are the ones to track nor when the positioning can be started. This kind of situation is apt to occur in an initial phase of the satellite tracking after the GPS receiver power has turned on.

The total number of the GPS satellites already placed in orbits as of May 1989 is only seven. So, at present, it takes little time for the GPS receiver to chase all the seven GPS satellites randomly. But when the GPS system is completed with all 24 GPS satellites, an attempt to chase all these GPS satellites simply one after another to capture an appropriate number of GPS satellites will require a significant amount of time in the initial tracking operation.

The simplest method of solving this problem is to provide the same number of receiving channels as the GPS satellites so that there is a one-to-one correspondence between the receiving channels and the GPS satellites. For a vehicle mountable navigation equipment, however, this method is not practical because of high production cost and difficulty in making the equipment compact.

It is therefore an object of the invention to eliminate aforesaid problems and to provide a method of tracking satellite signals for GPS receivers which enables the GPS receivers to perform the initial satellite tracking operation in as short a time as possible when there are a large number of GPS satellites.

SUMMARY OF THE INVENTION

A method of tracking satellite signals for GPS receivers including the steps of: in an initial satellite tracking operation, selecting three or more GPS satellites in the same orbit as target satellites; and searching satellite signals from one selected target GPS satellite to another in succession.

When an attempt to capture the first target satellite fails, a GPS satellite at the farthest point from the target GPS satellite in the same orbit is selected as the next target for search.

It is planned to put twenty-four GPS satellites in all into six orbits, planes of which are designated by characters by A to F, which will accommodate four satellites each. In accordance with the present invention, three or more GPS satellites in the same orbit are selected always as the target GPS satellite to chase in the initial tracking operation by taking into account the aforesaid satellite arrangement in the orbits. When at least three GPS satellites out of four in one orbit are selected, at least one GPS satellite should be visible from the site of tracking. Therefore, chasing three or more GPS satellites within the same orbit in succession will result in one of the GPS satellites being captured within a short period of time. This invention is based on this concept and makes it possible for the GPS receiver to perform an expeditious initial tracking of a GPS satellite even if there have been lost such navigation data as a GPS clock, almanac information and the like, which are necessary for the GPS receiver to come into contact with GPS satellites.

In the arrangement described above, determining which orbital plane out of the six A to F should be used for satellite tracking is a matter of convenience but it primarily depends on the number of GPS satellites in orbits and the satellite distribution among the orbital planes at time of orbit selection. When the GPS receiver has a plurality of receiving channels, it is possible to allocate a different orbit to each channel and select three or more target GPS satellites in each orbit so that the tracking operation can be done simultaneously on the multiple channels.

The orbital arrangement of 24 GPS satellites was made public on Sep. 19–23, 1988 at the meeting of the Institute of Navigation (ION) held in Colorado Springs, CO, in the United States. On the basis of this information, the tracking operation will be explained by referring to the orbit A for example.

The distribution of four satellites A1 to A4 in the orbit A is shown in FIG. 2. The center circle represents the Earth and the GPS receiver is assumed to be at point P.

In the process of choosing three or more GPS satellites in this orbit A as the targets and searching them one after another, let us assume that the GPS satellite A4 is currently under search but fails to be captured within a specified period of time. In this case, there is a high possibility that the GPS satellite A4 is at the back side of the Earth where the satellite A4 is not visible from the present position of the GPS receiver P or the site of tracking. This may be interpreted as follows. A GPS satellite which is on the same orbit but most distant from the GPS satellite A4 is most likely to be situated where it is visible from the site of tracking P and can therefore be captured. In the case of FIG. 2 the prospective satellite is A2 (A2 is 137°=220°−83° apart from the satellite A4; A3 is 113°=83°+360°−330° apart from A4).

Thus, in the process of searching for the three or more GPS satellites in the same orbit, when the GPS satellite currently under search has failed to be captured, the receiver may select as the next target a GPS satellite which is at the most distant position from the last target satellite in the same orbit. This will increases the chance of capturing the GPS satellite.

In this way, when one of the GPS satellites is captured during the initial tracking operation, the GPS receiver can be synchronized with the GPS clock based on the navigation data obtained from the captured GPS satellite. Further, it is possible to calculate accurate orbital positions of all other GPS satellites by utilizing almanac information contained in the navigation data, so that the GPS receiver is able to select and track the most appropriate satellites for positioning.

PREFERRED EMBODIMENT OF THE INVENTION

Now, one embodiment of the invention will be described by referring to the accompanying drawings.

Figure 1:
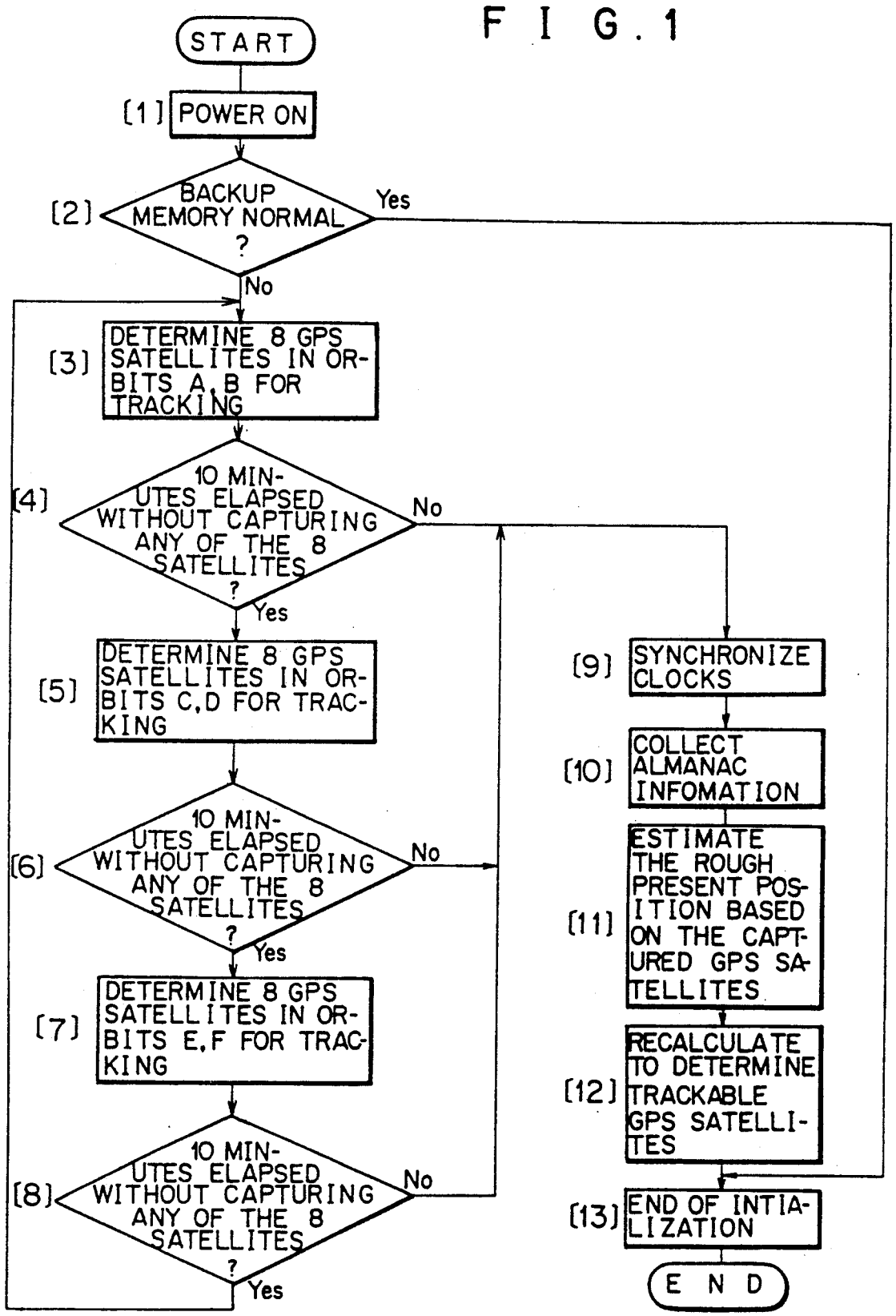
FIG. 1 is a flowchart showing, as one embodiment of the invention, operational steps performed by a GPS receiver in the GPS satellite tracking operation.

FIG. 1 is a flowchart showing one example of operational steps for capturing satellites in accordance with the present invention. Upon initiation of power supply to the GPS receiver (step [1]), a controller in the GPS receiver such as a microcomputer makes an access to a backup memory for checking whether or not valid navigation data like almanac information required for determining the positions of GPS satellites is stored (step [2]). If it is, since the position of each GPS satellite can be calculated by using the stored data, the program goes to step [13] to end the initialization, whereas if the data is not available, the program goes to step [3] and the initial tracking operation will start, as it will be described hereinafter.

It is assumed that the GPS receiver has two receiving channels CH1 and CH2 and that the two receiving channels are multiplexed in time-division for permitting the GPS receiver to perform simultaneous search for a plurality of GPS satellites, 8 in total, in a sequential manner, with four GPS satellites assigned to each receiving channel.

Upon initiation of the initial tracking operation in accordance with this invention, the step [3] selects and assigns four GPS satellites in the orbit A to the channel CH1 and four GPS satellites in the orbit B to the channel CH2. Sequential search for those four GPS satellites in each orbit is started in two channels CH1 and CH2 simultaneously.

Figure 2:
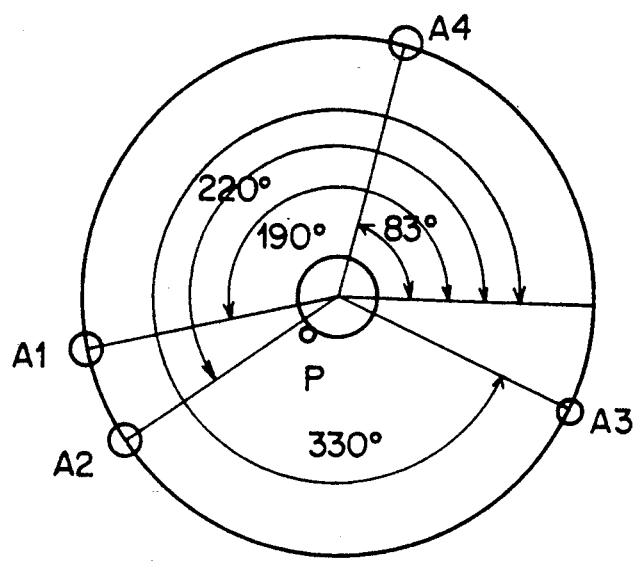
FIG. 2 is a schematic diagram illustrating a sequence of searching GPS satellites in the same orbit.

As previously mentioned in connection with FIG. 2, when the GPS satellite being searched for has failed to be captured, the next target GPS satellite should be the one at the most distant position from the last target GPS satellite within the same orbit. This step for selecting the target GPS satellite is repeated until one of the GPS satellites is captured by the GPS receiver.

At step [4], if the GPS receiver fails to capture any of the eight GPS satellites in the two orbits A and B within a specified length of time, for example, 10 minutes, the program goes to step [5]. The step [5] selects other two orbits C and D for the succeeding search operation and assigns them to the channels CH1 and CH2, respectively. Four GPS satellites are then selected in each of the orbits C and D and are searched by the initial tracking operation in a manner mentioned above.

At the next step [6], if the GPS receiver fails to catch any of the eight GPS satellites in the two orbits C and D, within a predetermined period of time, for example, 10 minutes, the program goes to step [7]. The step [7] selects new two orbits E and F and assigns them to the channels CH1 and CH2, respectively. Four GPS satellites are selected in each orbit and then the initial tracking operation is performed in each of the two channels in the same way as mentioned above.

Further, at step [8], if the GPS receiver fails to find any of the eight GPS satellites in the orbits E and F as well within a specified duration of, for example, 10 minutes, the program returns to step [3] where the program repeats the above-mentioned initial tracking operation.

Now, it is assumed that one of the GPS satellites is caught at one of the steps [4], [6] and [8]. The program proceeds to step [9] where a clock of the GPS receiver is synchronized with the GPS clock according to the navigation data received from the GPS satellite in contact. At the same time, the navigation data from the captured GPS satellite are also collected (step [10]). Based on almanac information contained in the navigation data of the captured GPS satellite, the step [11] makes a rough estimate of a position of the GPS receiver, which is taken as a point of intersection between the Earth's surface and a line connecting the captured GPS satellite and the Earth's center. At step [12], the controller then performs recalculation to determine the trackable GPS satellites from the estimated present position of the GPS receiver (step [12]), before terminating the initialization operation (step [13]).

Once the GPS satellites, that are trackable from the estimated present position of the GPS receiver, have been determined in this manner, it is very easy to select and track three or four GPS satellites that are most suited for positioning. By receiving the radio signals from the selected GPS satellites, the receiver can quickly start calculating the exact position of the vehicle carrying the GPS receiver.

The advantages of this invention may be summarized as follows. The initial phase of GPS satellite tracking operation consists in selecting three or more GPS satellites in the same orbit and successively tracking satellite signals, from one GPS satellite to another. Therefore, this method enables the GPS receiver to catch signals from the GPS satellites in quick succession even when the receiver has lost all the navigation data such as GPS clock and almanac information, thereby reducing the time taken by the initial tracking operation and making it possible to start the positioning calculation more quickly.

When the search for the selected GPS satellite has failed, the receiver selects as the next target a satellite in the same orbit which is farthermost from the last selected GPS satellite, thus resulting in a further reduction in the time required by the initial tracking operation.

What is claimed is:

1. A satellite signal tracking method for a GPS receiver including the steps of:

selecting three or more GPS satellites in a first orbit, all of said selected satellites being located in the same orbital plane, as targets upon initiation of an initial satellite tracking operation where the GPS receiver receives initialization data such as GPS clock data and almanac data; and searching for initialization data transmitted from the selected GPS satellites by checking each selected satellite in sequence during the initial satellite tracking operation.

2. A satellite signal tracking method for a GPS receiver as claimed in claim 1, further including a step of picking out a second GPS satellite among the selected GPS satellites in the first orbit, as the next one to search, which is at the furthermost point in the same orbit from the first GPS satellite being searched when failed in catching the first GPS satellite.

3. A satellite signal tracking method for a GPS receiver as claimed in claim 1, further including a step of selecting three or more GPS satellites in a second orbit as targets and reiterating the searching for satellite signals when failed in catching any of the GPS satellites in the first orbit.

4. A satellite signal tracking method for a GPS receiver as claimed in claim 3, further including a step of assigning the three or more GPS satellites in the first orbit to a first receiving channel of a GPS receiver and that the three or more GPS satellites in the second orbit to a second receiving channel of the GPS receiver for searching satellite signals in a parallel operation.

5. A satellite signal tracking operation for a GPS receiver as claimed in 1, 2, 3 or 4, further including the steps of:

synchronizing a clock of the GPS receiver with a GPS clock of a captured GPS satellite;

collecting almanac information from the captured GPS satellite;

making a rough estimate of a position of the GPS receiver based on the collected almanac information; and recalculating orbital positions of GPS satellites which are trackable from the estimated position of the GPS receiver for accomplishing the initialization.

6. A satellite signal tracking method for a GPS receiver as claimed in claim 2, further including a step of selecting three or more GPS satellites in a second orbit as targets and reiterating the searching for satellite signals when failed in catching any of the GPS satellites in the first orbit.

* * * * *